US009853693B2

(12) United States Patent
Smith et al.

(10) Patent No.: US 9,853,693 B2
(45) Date of Patent: Dec. 26, 2017

(54) LOCATING AN IN-VEHICLE NEAR FIELD COMMUNICATION (NFC) ANTENNA

(71) Applicant: GM GLOBAL TECHNOLOGY OPERATIONS LLC, Detroit, MI (US)

(72) Inventors: Dustin H. Smith, Auburn Hills, MI (US); John Sergakis, Bloomfield Hills, MI (US); Wen Gu, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/077,641

(22) Filed: Mar. 22, 2016

(65) Prior Publication Data

US 2017/0279498 A1      Sep. 28, 2017

(51) Int. Cl.
*H04B 5/00* (2006.01)
*G08B 5/38* (2006.01)
*G08B 5/36* (2006.01)

(52) U.S. Cl.
CPC ............. *H04B 5/0056* (2013.01); *G08B 5/36* (2013.01); *G08B 5/38* (2013.01)

(58) Field of Classification Search
CPC .. H04B 5/0056; H04B 10/116; H04B 1/3822; G06Q 20/34; G08B 5/36; G08B 5/38
See application file for complete search history.

(56) References Cited

U.S. PATENT DOCUMENTS

2014/0347179 A1* 11/2014 Fleszewski ............ G08C 17/02
                                                                    340/468
2015/0061541 A1   3/2015 Gandini

FOREIGN PATENT DOCUMENTS

CN            204117341              1/2015

* cited by examiner

*Primary Examiner* — Kabir A Timory
(74) *Attorney, Agent, or Firm* — Harness, Dickey & Pierce, P.L.C.

(57) ABSTRACT

In an example of a method for locating a Near Field Communication (NFC) antenna, an indication of an imminent use of the NFC antenna is received. In response to receiving the indication, a light is caused to illuminate a location of the NFC antenna, a logo of the NFC antenna, or an area within proximity of the location of the NFC antenna in a pattern.

16 Claims, 6 Drawing Sheets

LOCATING AN IN-VEHICLE NEAR FIELD COMMUNICATION (NFC) ANTENNA

TECHNICAL FIELD

The present disclosure relates generally to locating a Near Field Communication (NFC) antenna.

BACKGROUND

Many consumer electronic devices are equipped with Near Field Communication (NFC) capabilities that allow two devices to communicate with one another when in close proximity to each other (e.g., within approximately four centimeters). NFC is a form of contactless communication technology that allows the devices to communicate with one another securely. NFC may be used to link two wireless devices, such as a personal device (e.g., phone) and another wireless communicating device (e.g., tablet or other computer, headset, etc.), for downloading files, messages, music, video, and for various other applications.

SUMMARY

In an example of a method for locating a Near Field Communication (NFC) antenna, an indication of an imminent use of the NFC antenna is received. In response to receiving the indication, a light is caused to illuminate a location of the NFC antenna, a logo of the NFC antenna, or an area within proximity of the location of the NFC antenna in a pattern. In an example of a method for locating an in-vehicle Near Field Communication (NFC) antenna, an indication of an imminent use of the in-vehicle NFC antenna is received. In response to receiving the indication, an in-vehicle light is caused to illuminate a location of the in-vehicle NFC antenna, a logo of the in-vehicle NFC antenna, or an area within proximity of the location of the in-vehicle NFC antenna in a pattern.

An example of a system for locating an in-vehicle Near Field Communication (NFC) antenna includes a vehicle communications platform operatively disposed in a vehicle and an in-vehicle lighting system having a control module in communication with the vehicle communications platform. The vehicle communications platform is for recognizing an indication of an imminent use of the in-vehicle NFC antenna, and for transmitting a lighting instruction to the in-vehicle lighting system upon recognizing the indication of the imminent use. The control module of the in-vehicle lighting system is responsive to the lighting instruction.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the methods and systems as disclosed herein may be used to provide, to a user, visual guidance as to where the NFC antenna is located on/in a NFC-capable object in response to an indication that the NFC antenna will soon be used by the user. The visual guidance is provided by a light illuminating the location of the NFC antenna, a logo of the NFC antenna, or an area within proximity of the location of the NFC antenna in a pattern. In some examples, the light is a backlight that illuminates the location, logo, or area from behind. In other examples, the light is a spotlight that illuminates the location, logo, or area by projecting a narrow light beam onto the location of the NFC antenna, the logo of the NFC antenna, or the area within proximity of the NFC antenna in the pattern. In still other examples, the light is positioned within proximity of the location of the NFC antenna. The indication that the NFC antenna will soon be used by the user may be in the form of an input received through a user interface, a time of day, or a detection of a NFC-capable device. When the NFC-capable object is a vehicle, the indication that the NFC antenna will soon be used may also be in the form of an advisor input received at the vehicle.

As used herein "NFC antenna" or "in-vehicle NFC antenna" is an antenna or sensor or chip, or tag that is capable of establishing a NFC connection with a NFC-capable device.

As used herein, "within proximity of the NFC antenna" or "within proximity of the in-vehicle NFC antenna" refers to a distance that is sufficiently close so that when a NFC-capable device is placed within the distance, a NFC connection may be established between the NFC-capable device and the NFC antenna or the in-vehicle NFC antenna. In some examples, "within proximity of the NFC antenna" or "within proximity of the in-vehicle NFC antenna" may mean within about four centimeters of the location of the NFC antenna or the in-vehicle NFC antenna. The area that is "within proximity of the NFC antenna" or "within proximity of the in-vehicle NFC antenna" may include the space surrounding the NFC antenna in the plane of the console, dashboard, etc. where the NFC antenna is located, the space above the NFC antenna (i.e., between the user and the NFC antenna), and the space behind the NFC antenna.

Figure 1:
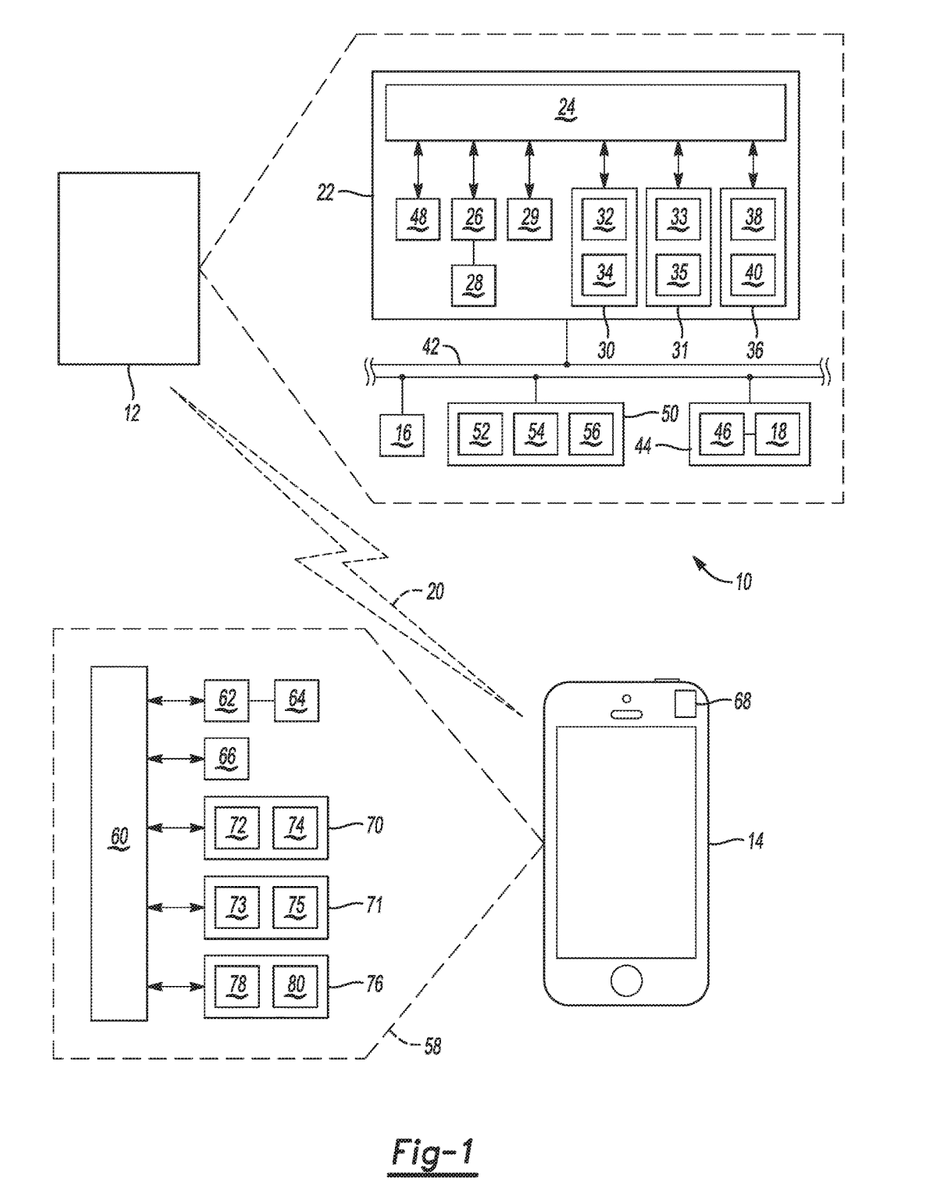
FIG. 1 is a schematic view of an example of a system for locating a NFC antenna.

Referring now to FIG. 1, an example of the system 10 for locating a NFC antenna 16 is depicted. The system 10 includes the NFC-capable object 12. The system 10 may also include a NFC-capable device 14.

Figure 4:
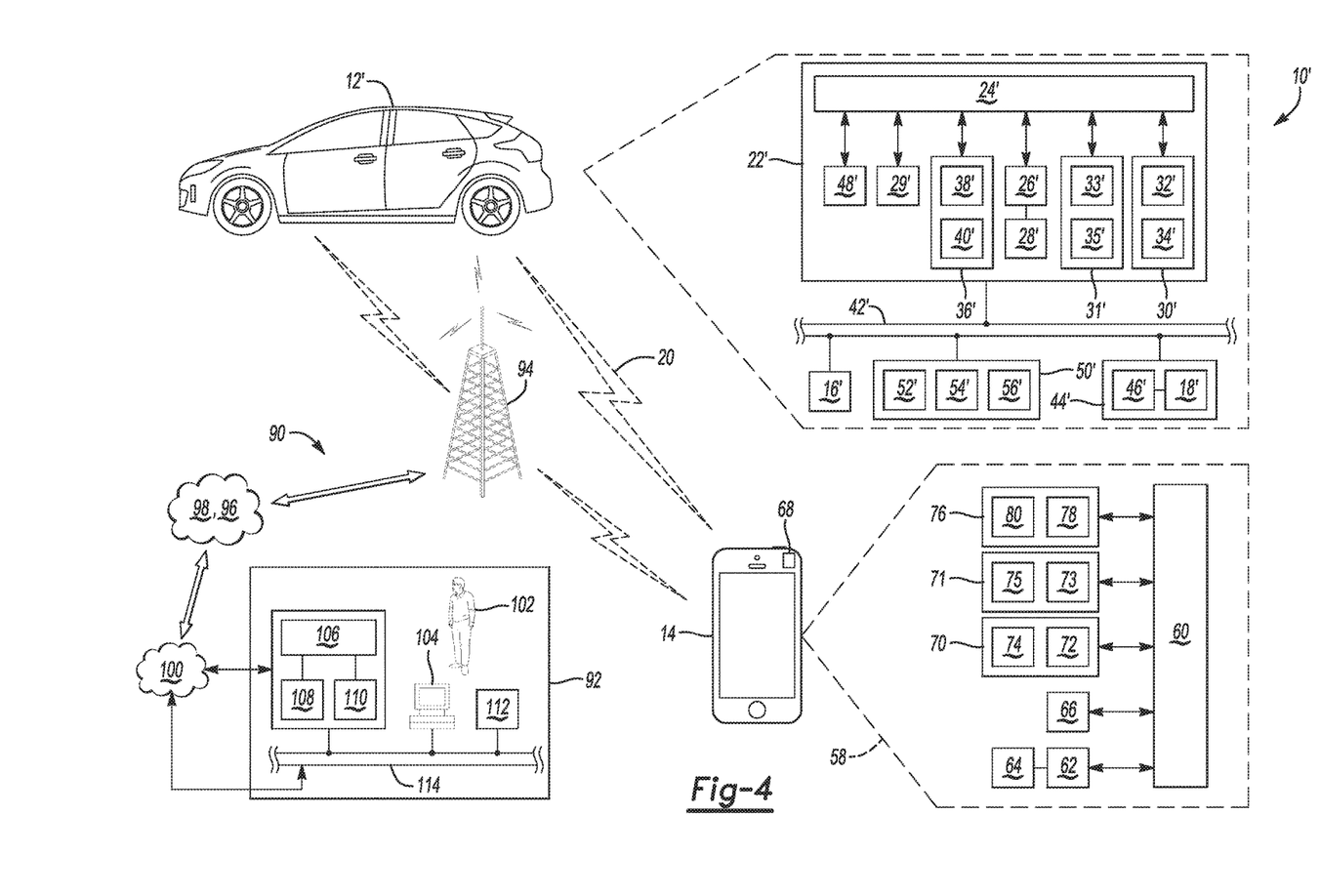
FIG. 4 is a schematic view of an example of a system for locating an in-vehicle NFC antenna.

The NFC-capable object 12 may be any object that is equipped with the NFC antenna 16, and suitable hardware and computer readable instructions/code that enable it to cause the light 18 to illuminate the location of the NFC antenna 16, a logo of the NFC antenna 16, or an area within proximity of the location NFC antenna 16 in a pattern in response to receiving an indication 82 (shown in FIG. 2) of an imminent use of the NFC antenna 16. Some examples of the NFC-capable object 12 include the vehicle 12' (shown in FIG. 4), point of sale (POS) terminals, and consumer electronics (CE) devices, such as refrigerators, washing machines, vacuum cleaners, ovens, televisions, DVD players, or video game consoles. While several examples have been provided, it is to be understood that the NFC-capable object 12 may be any object capable of NFC communications. In some instances, the NFC-capable object 12 may also be equipped with suitable hardware and computer readable instructions/code that enable it to communicate (e.g., transmit and/or receive voice and data communications) over a carrier/communication system 90 (shown in FIG. 4) and/or using short-range wireless technology.

The location of the NFC antenna 16 on or in the NFC-capable object 12 may depend upon the type of object 12. For example, the NFC antenna 16 in a vehicle 12' (shown in FIG. 4) may be positioned at or beneath the surface of the console, dashboard, infotainment control panel, etc., or within a physical control (e.g., a rotary controller, such as a volume knob). For another example, the NFC antenna 16 in an appliance may be positioned in a housing that is positioned within a door (e.g., at an edge or inside the surface) of the appliance. For still another example, the NFC antenna 16 may be positioned within a battery pack of an object 12 or on an interior portion of the object's exterior panel, housing, etc.

Some of the hardware and computer readable instructions/code of the object 12 may be embodied in a communication/communications platform (CP) 22. The CP 22 includes hardware components that are capable of running computer readable instructions/code 28, which are embodied on non-transitory, tangible computer readable media.

The CP 22 may provide a variety of services. The service(s) provided by the CP 22 may depend on the type of NFC-capable object 12. One example of these services includes the CP 22 transmitting a lighting instruction 84 (shown in FIG. 2) to the control module 46 of the lighting system 44 upon recognizing the indication 82 of the imminent use of the NFC antenna 16. Other examples include the CP 22 monitoring for i) a loss of the low energy, short-range wireless communication signal, the short-range wireless communication signal, or the wireless local area network signal and ii) the time since causing the light 18 to illuminate the NFC antenna 16, the logo of the NFC antenna 16, or the area within proximity of the NFC antenna 16. Other services provided by the CP 22 may depend on the type of NFC-capable object 12.

The CP 22 includes an electronic processing device 24 operatively coupled to one or more types of electronic memory 26. In an example, the electronic processing device 24 is a microprocessor. In other examples, the electronic processing device 24 may be a micro controller, a controller, and/or a host processor. In another example, electronic processing device 24 may be an application specific integrated circuit (ASIC). The electronic memory 26 of the CP 22 may be an encrypted memory that is configured to store i) computer readable instructions/code 28 to be executed by the processor 24, ii) data associated with the various systems of the NFC-capable object 12 (i.e., object data, serial or identification number, etc.), iii) a user-defined indication of an imminent use of the NFC antenna 16, and/or the like. The electronic memory 26 may be a non-transitory, tangible computer readable media (e.g., RAM).

The CP 22 may be used for communications. The CP 22 is at least equipped with a NFC module 29. The NFC module 29 is equipped with hardware that supports NFC technology/protocol. An example of the NFC module 29 is an NFC chipset/integrated circuit, which may include a microprocessor, a memory, an interface to a main processor (e.g., 24), a radio frequency interface to the NFC antenna 16, a clock management module, and a power management module. The NFC module 29 is in communication with the NFC antenna 16, which transmits and receives signals/data to and from an NFC enabled device 14.

In some instances, communications are also enabled through the CP 22 via a short-range wireless communication module 30 or a low energy, short-range wireless communication module 31. The module 30 is equipped with hardware that supports short-range wireless communication technology. Examples of short-range wireless communication technologies include standard BLUETOOTH® and various classes thereof, dedicated short-range communications (DSRC), or WI-FI™, WI-GIG™, and various classes thereof. The module 31 is equipped with hardware that supports low energy, short-range wireless communication technology. An example of the low energy, short-range wireless communication technology is BLUETOOTH® low energy (i.e., BLUETOOTH® LE (BLE) or BLUETOOTH® Smart).

Each of the modules 30, 31 includes a respective transceiver 32, 33 (or a transmitter and a receiver) and a respective node 34, 35. Each transceiver 32, 33 includes a respective signal emitter for transmitting signals/data and a respective signal receiver for receiving signals/data. The respective nodes 34, 35 allow the modules 30, 31 to communicate, via a short-range wireless communication link 20, with other device(s) that are short-range wireless communication enabled or low energy, short-range wireless communication enabled. The node 34, 35 provides the autonomous communication link 20 with the other enabled device(s) after an initial pairing between the modules 30, 31 and the respective modules of the other enabled device(s). The nodes 34, 35 may be standalone chipsets/modems, or may be integrated as part of the transceiver 32, 33, or may be integrated as part of any other circuit in the module 30, 31.

In other instances, communications are also enabled through the CP 22 via a communications module 36, which includes a cellular chipset/component 38 for voice communications and a data transmission system 40 for data transmission. The cellular chipset/component 38 of the CP 22 may be an analog, digital, dual-mode, dual-band, multi-mode and/or multi-band wireless transceiver. The cellular chipset/component 38 uses one or more prescribed frequencies in standard analog and/or digital bands in the current market for cellular systems. Any suitable protocol may be used, including digital transmission technologies, such as TDMA (time division multiple access), CDMA (code division multiple access), W-CDMA (wideband CDMA), FDMA (frequency-division multiple access), OFDMA (orthogonal frequency-division multiple access), etc.

In an example, the data transmission system 40 may include a packet builder, which is programmed to make decisions about what packet to send (e.g., bandwidth, data to include, etc.) and to actually build a packet data message. In another example, the data transmission system 40 may include a wireless modem, which applies some type of encoding or modulation to convert the digital data so that it can communicate through a vocoder or speech codec incorporated in the cellular chipset/component 38. It is to be understood that any suitable encoding or modulation technique that provides an acceptable data rate and bit error may be used with the examples disclosed herein. While examples have been provided, it is to be understood that any suitable data transmission system 40 may be used.

The CP 22 is operatively connected to the bus system 42. The bus system 42 may utilize a variety of networking protocols, such as a controller area network (CAN), a media oriented system transfer (MOST), a local interconnection network (LIN), an Ethernet, TCP/IP, and other appropriate connections such as those that conform with known ISO, SAE, and IEEE standards and specifications, to name a few. The bus system 42 enables the NFC-capable object 12 to send signals (e.g., real-time bus messages, alert notifications) from the CP 22 to various units of equipment and systems (e.g., light 18 and lighting system 44). The bus system 42 also enables the NFC-capable object 12 to receive signals at the CP 22 from various units of equipment and systems (e.g., user interface 50). An example of a signal received by the bus 42 includes an indication 82 of an imminent use of the NFC antenna 16 received at the user interface 50. An example of a signal transmitted by the bus 42 includes a lighting instruction 84 from the processor 24 to the lighting system 44 of the NFC-capable object 12.

The CP 22 may also include other components, such as, for example, a real-time clock 48. The real-time clock (RTC) 48 provides accurate date and time information to the CP 22 hardware and software components that may require and/or request date and time information. In an example, the RTC 48 may provide time and/or date information for the CP 22 to monitor the time since causing the light 18 to illuminate the location of the NFC antenna 16, the logo of the NFC antenna 16, or the area within proximity of the location of the NFC antenna 16.

As illustrated in FIG. 1, the NFC-capable object 12 may also include other systems that are directly or indirectly connected to the bus system 42. Examples of one of these other systems include a lighting system 44 and a user interface 50.

The lighting system 44 includes the control module 46 and the light 18. The control module 46 is in communication with the CP 22 via the bus system 42. The control module 46 is also operatively connected to the light 18. The control module 46 is responsive to the CP 22, and the light 18 is responsive to the control module 46. The control module 46 is an electronic control unit that is capable of monitoring for instructions from the CP 22, and of controlling the light 18. Generally, the control module 46 recognizes a lighting instruction 84 from the CP 22, generates a lighting output 86 (shown in FIG. 2) that corresponds with the lighting instruction 84, and transmits the lighting output 86 to the light 18. In response, the light 18 illuminates the location of the NFC antenna 16, or the logo of the NFC antenna 16, or the area within proximity of the location of the NFC antenna 16 in the pattern, according to the lighting output 86.

The control module 46 includes a microprocessor and an electronic memory. The control module 46 also includes computer-readable instructions that are stored on the memory and are executable by the microprocessor. The control module 46 receives the lighting instruction 84 from CP 22, and translates the received instruction(s) (or command(s)) into lighting output 86, which includes a function to be implemented by the light 18. The control module 46 causes the light 18 to perform the function.

The light 18 may be any light source (e.g., bulb, light emitting diode (LED), etc.) that is dedicated to illuminating the location of the NFC antenna 16, the logo of the NFC antenna 16, or the area within proximity of the location NFC antenna 16 in the pattern. Examples of the various patterns are described further herein.

In one example, the light 18 is a backlight that illuminates the location of the NFC antenna 16. For example, when the NFC antenna 16 is embedded in the object 12, the object 12 may include a transparent portion that covers the NFC antenna 16, and a backlight that is positioned behind the NFC antenna 16. When illuminated, the backlight lights up the location of the NFC antenna 16, and the light is visible through the transparent portion. In another example, the light 18 is a backlight that illuminates the logo of the NFC antenna 16. When the NFC antenna 16 is embedded in the object 12, the NFC logo may be hard-printed in (e.g., etched in, engraved in, etc.) the exterior surface of the object 12 at a position that indicates the location of the NFC antenna 16 in the object 12. In this example, when the backlight is illuminated, the logo is illuminated because the light shines through the hard-printed logo. In still another example, the light 18 is a backlight that illuminates the area within proximity of the location of the NFC antenna 16 in a pattern from behind. For example, when the NFC antenna 16 is embedded in the object 12, the object 12 may include a transparent portion that covers the area surrounding the NFC antenna 16, and a backlight that is positioned behind the transparent portion. When illuminated, the backlight lights up the area surrounding the NFC antenna 16, and the light is visible through the transparent portion.

In another example, the light 18 is a spotlight that illuminates the location of the NFC antenna 16, the logo of the NFC antenna 16, or the area within proximity of the location of the NFC antenna 16 by projecting a narrow light beam onto the location of the NFC antenna 16, the logo of the NFC antenna 16, or the area within proximity of the location of the NFC antenna 16 in the pattern. If the NFC antenna 16 is located on an exterior surface of the object 12 or a component of the object 12, the spotlight can light up the actual location of the NFC antenna 16. For example, if the NFC antenna 16 is on the vehicle dashboard, the spotlight can light up the NFC antenna 16 on the vehicle dashboard. If the NFC antenna 16 is embedded in the object 12, the spotlight may be used to illuminate the portion of the exterior surface of the object 12 or the component of the object which overlies the position of the NFC antenna 16. As mentioned above, the light 18 may be a spotlight that illuminates the logo of the NFC antenna 16. In this example, the logo may be hard-printed or painted on the exterior surface which overlies the position of the NFC antenna 16, or the logo may be a sticker positioned on the exterior surface which overlies the position of the NFC antenna 16. Also as mentioned above, the light 18 may be a spotlight that illuminates the area within proximity of the location of the NFC antenna 16 in the pattern. For example, when the NFC antenna 16 is embedded in the object 12, the spotlight may be positioned to light up a particular area that surrounds the location of the NFC antenna 16 (e.g., a ring surrounding the NFC antenna 16 may be lit up), or to light up the location of the NFC antenna 16 as well as the area that surrounds the location of the NFC antenna 16 (e.g., a full circle surrounding the NFC antenna 16 may be lit up).

In still another example, the light 18 is able to illuminate the location of the NFC antenna 16, the logo of the NFC antenna 16, or the area within proximity of the location of the NFC antenna 16 because the light 18 is within proximity of the NFC antenna 16. In this example, the light 18 may be a single light or a light strip (e.g., positioned on any of the console, dashboard, etc. or other exterior surface of the object 12). In this example, the light 18 may be a single light or may include several lights that together illuminate the location of the NFC antenna 16. For example, the light(s) may be positioned on a portion of the exterior surface of the object 12 or the component of the object which overlies the position of the NFC antenna 16. For another example, the light(s) 18 may be arranged to form the logo of the NFC antenna 16. For still another example, the light(s) may form the pattern in and/or around the area within proximity of the location of NFC antenna 16.

In the examples disclosed herein, it is to be understood that the light 18 is not alone a display graphic or a light of an NFC-capable object system (e.g., a backlight of the instrument panel, an alarm light, or another like system light).

In several of the examples disclosed herein, the area within proximity of the location NFC antenna 16 may be illuminated in a pattern. The pattern may resemble a geometric shape, such as a circle, a square, or a star. In some examples, the pattern is an outline that resembles the geometric shape (see, e.g., FIG. 3C). In other examples, the pattern resembles a fully filled in geometric shape (see, e.g., FIG. 3B). The pattern may also be a line or a series of lines in the area that enables a user to identify the location of the NFC antenna 16. The pattern may be defined, for example, by the transparent portion through which the backlight shines, the shape of the spotlight, and/or the arrangement of the light(s) 18 in the area.

The light 18 may be commanded to illuminate only the area within proximity of the location of the NFC antenna 16, only the location of the NFC antenna 16, or only the logo of the NFC antenna 16. In another example, the light 18 may be commanded to illuminate both the area within proximity of the location of the NFC antenna 16 and the location of the NFC antenna 16, both the area within proximity of the location of the NFC antenna 16 and the logo of the NFC antenna 16, or both the location of the NFC antenna 16 and the logo of the NFC antenna 16. In still another example, the light 18 may be commanded to illuminate the area within proximity of the location of the NFC antenna 16, the location of the NFC antenna 16, and the logo of NFC antenna 16. Additionally, the light 18 may be commanded to illuminate only part of the area within proximity of the light 18 may be commanded to NFC antenna 16, only part of the location of the NFC antenna 16, and/or only part of the logo of NFC antenna 16. In some examples, the light 18 does not illuminate any other area of the object 12 that is not the NFC antenna 16, the logo of the NFC antenna 16, or the area within proximity of the NFC antenna 16.

In some examples, the light 18 is a white light. In other examples, the light 18 is a colored light, such as a red light, an orange light, a yellow light, a green light, a blue light, a purple light, a pink light, or a brown light. The light 18 may change colors or may illuminate multiple colors at the same time. The light 18 may include differently colored bulbs or a red green blue (RGB) LED that is capable of changing to a desirable color. The light 18 may also be a flashing light (i.e., a light that turns on and off at least once every second) or a pulsing light (i.e., a light that modulates its brightness).

The user interface 50 is operatively connected to the bus system 42. The user interface 50 allows a user to input information and commands to the NFC-capable object 12 and receive information from the NFC-capable object 12. The user interface 50 may be any command-driven user interface or any menu-driven interface. In an example, the user interface 50 is a graphical user interface (GUI). In another example, the user interface 50 is a human machine interface (HMI). As shown in FIG. 1, the user interface 50 may include a microphone 52, a touchscreen 54, and/or a keypad 56.

The user interface 50 may assist the CP 22 with a variety of services. One example of these services includes the user interface 50 allowing a user to indicate to the CP 22 that he/she is about to use the NFC antenna 16. The user may speak a verbal command or series of verbal commands, select an icon or a series of icons, or type a word or phrase. The user interface 50 may collect and send data associated with the verbal command(s), icon(s), or word(s) to the CP 22. The CP 22 may recognize the data as an indication 82 of an imminent use of the NFC antenna 16 and send a lighting instruction 84 to the lighting system 44. Another example of a service the user interface 50 assists in providing is allowing a user to define an event so that the CP 22 will recognize it as an indication 82 of an imminent use of the NFC antenna 16. The user interface 50 may display an icon or menu item that the user can select to initiate the process to create an event that the CP 22 will recognize as an indication 82 of an imminent use of the NFC antenna 16. For example, the user may input that the powering up of the vehicle engine is an indication of the imminent use of the NFC antenna 16. To set the user-defined indication. Again, the user may speak a verbal command or series of verbal commands, select an icon or a series of icons, or type a word or phrase, and the user interface 50 may collect and send data associated with the verbal command(s), icon(s), or word(s) to the CP 22. The CP 22 may recognize the data as a user-defined indication, store the user-defined indication on the electronic memory 26, and monitor for an occurrence of the user-defined indication. Subsequently, when the CP 22 recognizes an occurrence of the user-defined indication, the CP 22 will send a lighting instruction 84 to the lighting system 44.

As mentioned above, some examples of the system 10 include the NFC-capable device 14. In the examples disclosed herein, the NFC-capable device 14 may be any mobile device, including a smart phone, such as a GSM/LTE phone or a GSM/CDMA/LTE phone. In other examples, the NFC-capable device 14 may be any portable device that has a device communication platform 58. Examples of other NFC-capable devices 14 include a wearable device (e.g., smart bracelet, smart watch, helmet, etc.), a tablet computer, etc., each of which may be, for example, GPS, cellular/Internet wireless communication enabled, and short-range wireless communication enabled.

As shown in FIG. 1, the device communication platform 58 includes at least a NFC module 66 and a NFC antenna 68 to transmit and receive signals/data. The NFC-capable device 14 also includes physical hardware (e.g., a microprocessor 60) and computer readable instructions 64 stored in an electronic memory 62. The microprocessor 60 of the NFC-capable device 14 may be similar to the processor 24 of the NFC-capable object 12, and is capable of executing the computer readable instructions 64 stored in the memory 62, which may be similar to the electronic memory 26.

The device communication platform 58 may also include a short-range wireless communication module 70 or a low energy, short-range wireless communication module 71. As discussed above, the short-range wireless communication capability (e.g., BLUETOOTH® and variations thereof) and/or the low energy, short-range wireless communication capability (e.g., BLUETOOTH® LE (BLE) and variations thereof) enable the NFC-capable device 14 to communicate with other short-range wireless communication and/or low energy, short-range wireless communication enabled devices (e.g., NFC-capable object 12). Each of the modules 70, 71 includes a respective transceiver 72, 73 for transmitting and receiving signals/data and a respective node 74, 75 for providing the autonomous communication link 20.

The device communication platform 58 may also include a communications module 76, which includes a cellular chipset/component 78 for voice communications and a data transmission unit 80 for data transmission.

Figure 2:
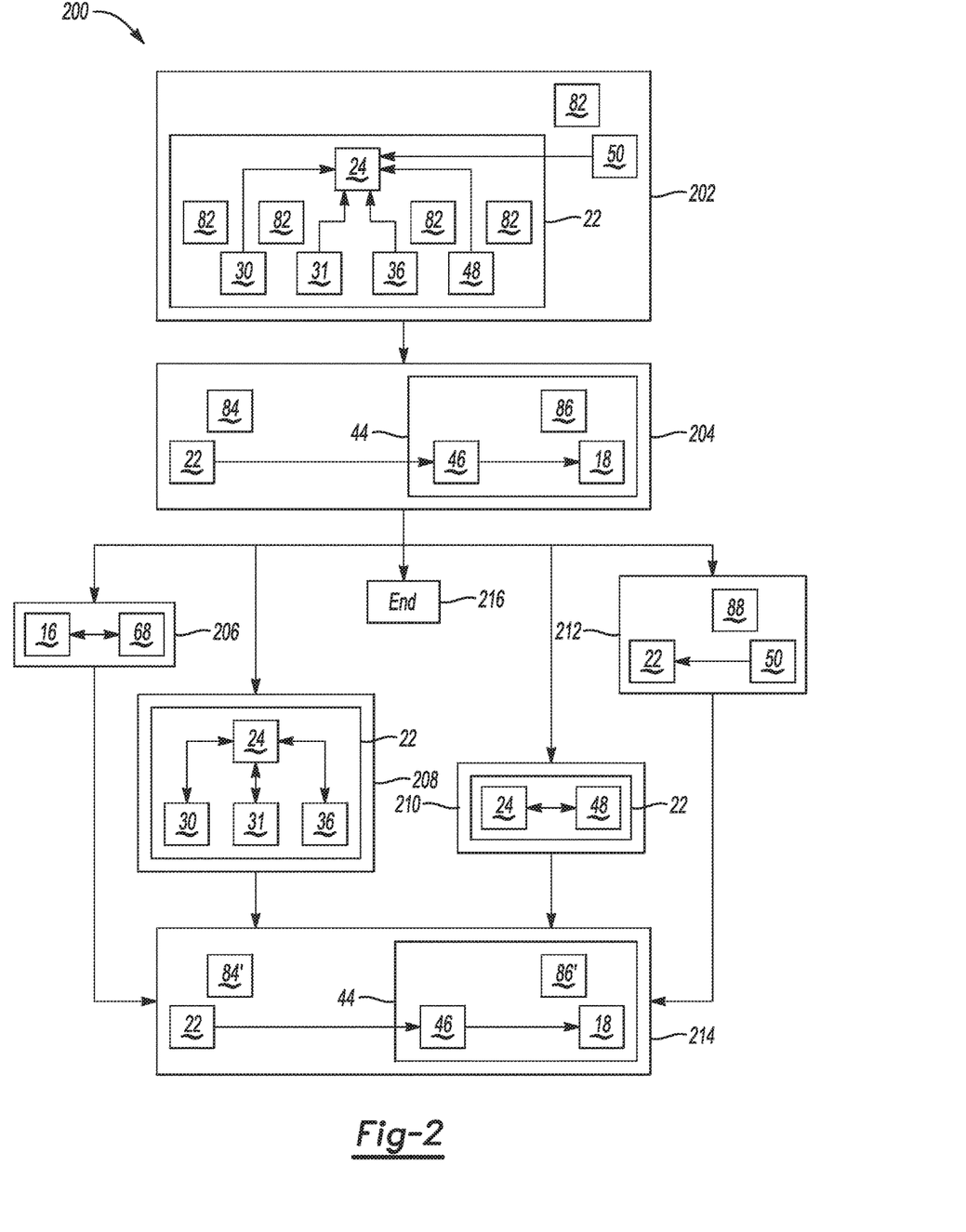
FIG. 2 is a flow diagram illustrating an example of a method for locating a NFC antenna.

Different components of the system 10, may be used to perform different examples of the method for locating a NFC antenna 16. One example of the method 200 is shown in FIG. 2.

At reference numeral 202, an indication 82 of an imminent use of the NFC antenna 16 is received by the processor 24 of the NFC-capable object 12. Several examples of how the indication 82 is transmitted to the process of the NFC-capable object 12 are shown in FIG. 2.

In one example, the indication 82 of the imminent use of the NFC antenna 16 is an input received at the user interface 50. In this example, the indication 82 is received by CP 22 from the user interface 50 of the NFC-capable object 12. When the indication 82 is an input received through a user interface 50, the input may be a verbal input received through the microphone 52 of the user interface 50 or a non-verbal input received through the touchscreen 54 or the keypad 56 of the user interface 50. As an example of the verbal input or the touchscreen/keypad input, a user of the NFC-capable object 12 may verbally indicate, or indicate by typing that he/she is planning to use the NFC-capable device 14, that he/she is looking for the NFC antenna 16, or the like.

In another example, the indication 82 of the imminent use of the NFC antenna 16 is a time of day. In this example, the indication 82 is received from the real-time clock 48. The time of day that indicates an imminent use of the NFC antenna 16 may be a set default time or may be a time set by the user. The user may use the user interface 50 of the NFC-capable device 12 or another user interface (not shown) that is not part of the NFC-capable object 12 but is in communication with the NFC-capable object 12 to set the time of day. The CP 22 may receive the user-defined time indication from the user interface 50 or other user interface. The CP 22 may then store the user-defined time indication on the electronic memory 26, and monitor for an occurrence of the user-defined time indication. In this example, the CP 22 monitors for an occurrence of the default time or the user-set time of day by receiving time data from the real-time clock 48.

In still another example, the indication 82 of the imminent use of the NFC antenna 16 is a detection of the NFC-capable device 14. The detection of the NFC-capable device 14 may be a detection of a wireless local area network signal, a detection of a short-range wireless communication signal, or a detection of a low energy, short-range wireless communication signal. When the detection of the NFC-capable device 14 is the detection of a wireless local area network signal, the communications module 36 of the NFC-capable object 12 recognizes a signal from the communications module 76 of the NFC-capable device 14. When the detection of the NFC-capable device 14 is the detection of a short-range wireless communication signal, the short-range wireless communication module 30 of the NFC-capable object 12 recognizes a signal from the short-range wireless communication module 70 of the NFC-capable device 14. When the detection of the NFC-capable device 14 is the detection of a low energy, short-range wireless communication signal, the low energy, short-range wireless communication module 31 of the NFC-capable object 12 recognizes a signal from the low energy, short-range wireless communication module 71 of the NFC-capable device 14. In these examples, the NFC-capable object 12 may be a listening/scanning device. As such, the communication module 36, the low energy, short-range wireless communication module 31, and/or the short-range wireless communication module 30 may be in a scanning mode where it continuously scans for a signal from another enabled device. In these examples, the indication 82 is received from the communications module 36, the short-range wireless communication module 30, and/or the low energy, short-range wireless communication module 31.

In an example where the NFC-capable object 12 is the vehicle 12' (FIG. 4), the indication 82 of the imminent use of the NFC antenna 16 may also be an advisor input received at the vehicle 12'. This example will be discussed in more detail in reference to FIG. 4.

In response to receiving the indication 82, the CP 22 (through processor 24 running computer-readable instructions 28) causes the light 18 to illuminate the location of the NFC antenna 16, a logo of the NFC antenna 16, or an area within proximity of the location of the NFC antenna 16 in the pattern. This is shown at reference numeral 204. The CP 22 transmits a lighting instruction 84 to the control module 46 of the lighting system 44. The control module 46 is responsive to the lighting instruction 84 from the CP 22. The control module 46 generates a lighting output 86 that corresponds with the lighting instruction 84, and transmits the lighting output 86 to the light 18. The lighting output 86 includes the function to be implemented by the light 18. The function may be for the light 18 to turn on, to turn on and blink, etc. Through the lighting output 86, the control module 46 causes the light 18 to perform the function. In response, the light 18 at least turns on, and thus illuminates the location of the NFC antenna 16, the logo of the NFC antenna 16, and/or the area within proximity of the location of the NFC antenna 16 in the pattern according to the lighting output 86.

Figure 3A:
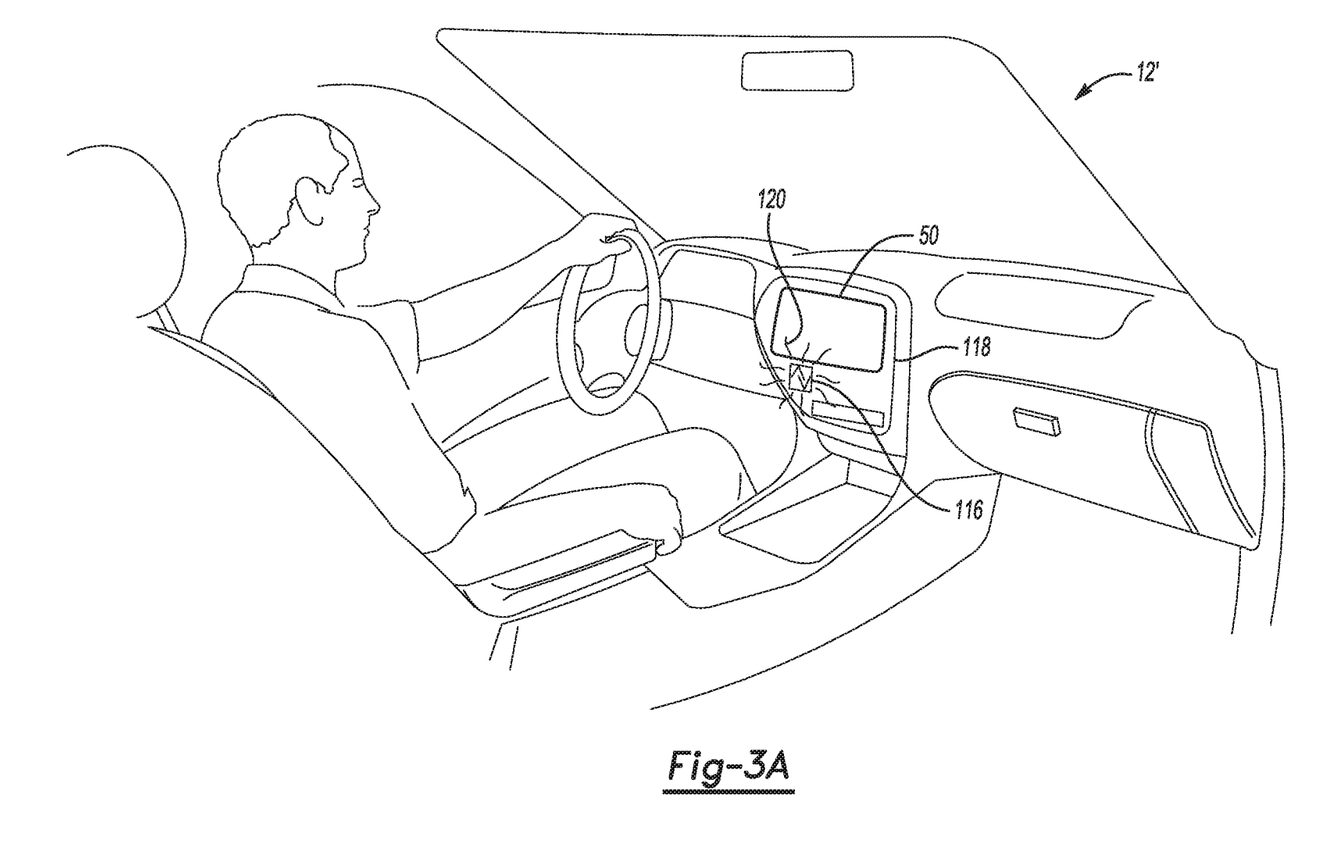
FIGS. 3A through 3C semi-schematically depict a vehicle interior and different examples of the illumination of the NFC antenna or a logo of the NFC antenna (FIG. 3A), and of an area within proximity of the NFC antenna in a pattern (FIGS. 3B and 3C)
Figure 3B:
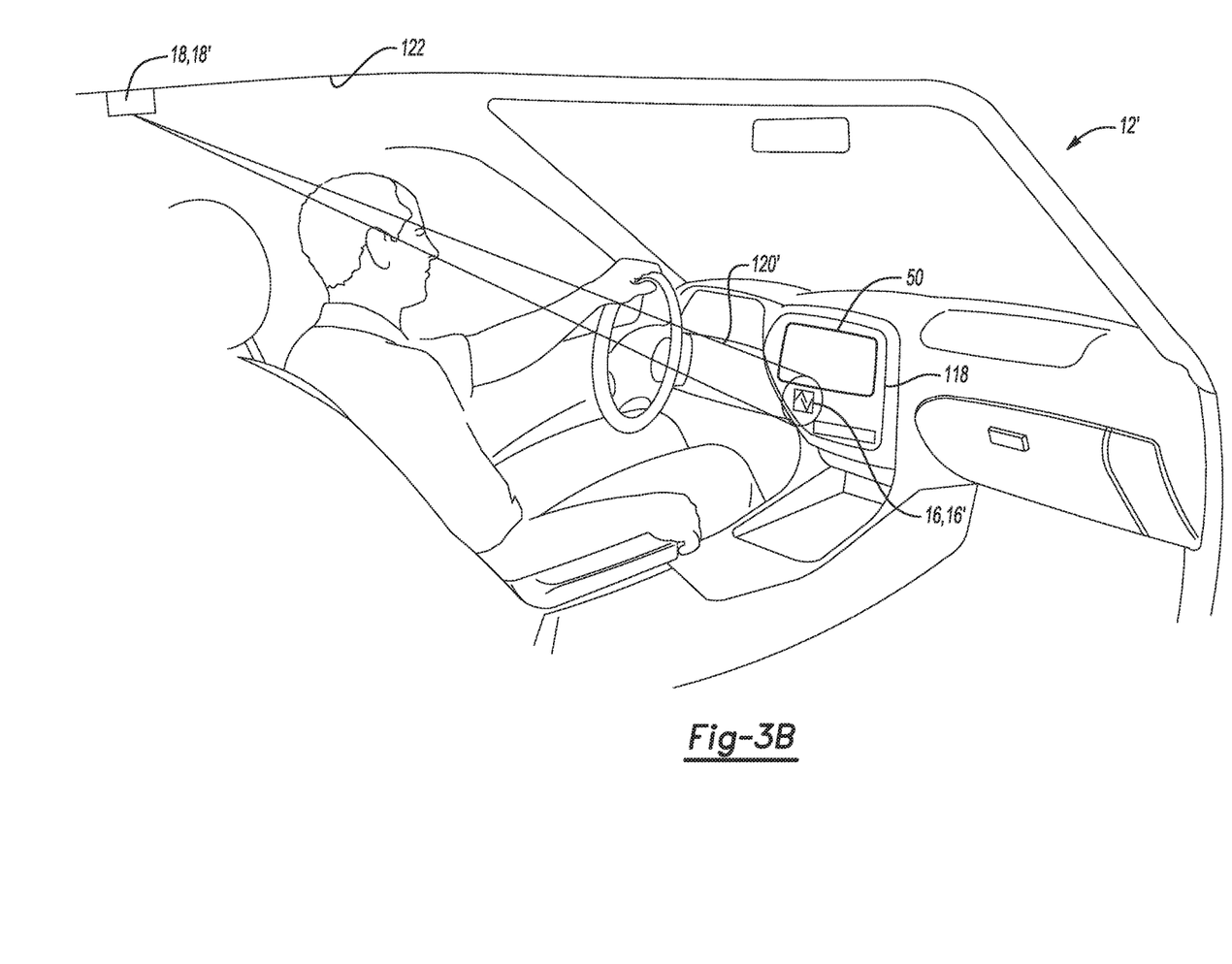
Figure 3C:
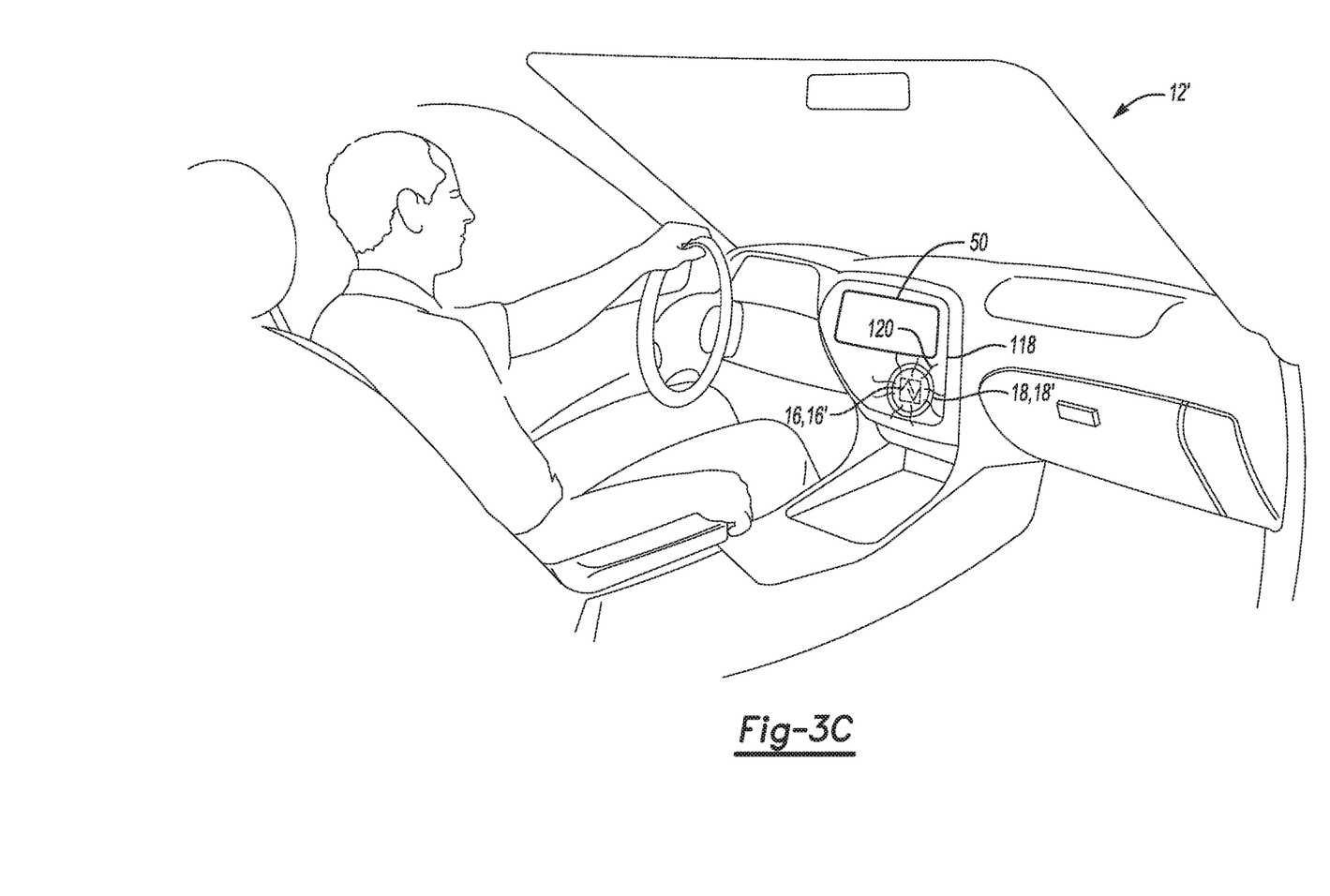

FIGS. 3A through 3C illustrate various examples when the light 18 turns on. In the examples illustrated in FIGS. 3A through 3C the light 18 is an in-vehicle light 18' and the NFC antenna 16 is an in-vehicle NFC antenna 16'. In FIG. 3A, neither the light 18, 18' nor the NFC antenna 16, 16' is shown, because they are each operatively positioned behind an infotainment panel 118 of the vehicle 12'. In this example, the light 18, 18' is a backlight positioned to light up the logo 116 that is hard-printed on the infotainment panel 118. The NFC antenna 16, 16' is operatively positioned behind the infotainment panel 118 and within NFC communication range of the logo 116. The light rays 120 illustrate the illumination of the logo 116.

In FIG. 3B, the NFC antenna 16, 16' is operatively positioned on the infotainment panel 118 of the vehicle 12'. In this example, the light 18, 18' is a spotlight positioned on the interior 122 of the roof of the vehicle 12'. In this example, the spotlight beam 120' has a circular pattern that encompasses the NFC antenna 16, 16', as well as the area within proximity of the location of the NFC antenna 16, 16'. The illuminated area may indicate to the user the boundary where he/she can hold his/her NFC-capable device 14 and still make the NFC connection with the NFC antenna 16, 16'.

In FIG. 3C, the NFC antenna 16, 16' is shown in hidden line because it is operatively positioned behind the infotainment panel 118 of the vehicle 12'. In this example, the light 18, 18' is an LED strip or a series of lights 18, 18' positioned on the infotainment panel 118 in a ring pattern that identifies the location of the NFC antenna 16, 16'. The light 18, 18' may also encompass the area within proximity of the location of the NFC antenna 16, 16'. The illuminated area may indicate to the user the boundary where he/she can hold his/her NFC-capable device 14 and still make the NFC connection with the NFC antenna 16, 16'.

Referring back to FIG. 2, several variations of the method 200 may take place after the CP 22 causes the light 18 to illuminate the location of the NFC antenna 16, the logo of the NFC antenna 16, and/or the area within proximity of the location of the NFC antenna 16 in the pattern (reference numeral 204). In one example, as shown at reference numeral 216, the method 200 may end after reference numeral 204. In another example, the method 200 may involve establishing a NFC connection and causing the light 18 to turn off (e.g., reference numerals 206 and 214). In still another example, the method 200 may involve monitoring the low energy, short-range wireless communication signal, the short-range wireless communication signal, or the wireless local area network signal for a loss of signal and, upon recognizing the loss of signal, causing the light 18 to turn off (e.g., reference numerals 208 and 214). In still another example, the method 200 may involve monitoring a time since causing the light 18 to illuminate the location of the NFC antenna 16, the logo of the NFC antenna 16, or the area within proximity of the location of the NFC antenna 16 and causing the light 18 to turn off after a set time has passed (e.g., reference numerals 210 and 214). In still another example, the method 200 involves receiving a turn off input 88 and causing the light 18 to turn off in response thereto (e.g., reference numerals 212 and 214). Each of these examples of the method 200 will be described in more detail below.

In an example, after the CP 22 and the control module 46 cause the light 18 to illuminate the location of the NFC antenna 16, the logo of the NFC antenna 16, or the area within proximity of the location of the NFC antenna 16 in the pattern (reference numeral 204), the NFC antenna 16 of the NFC-capable object 12 may establish a connection with the NFC antenna 68 of the NFC-capable device 14. This is shown at reference numeral 206. The NFC connection may be established by placing the NFC antenna 68 of the NFC-capable device 14 within proximity (e.g., within 4 cm) of the NFC antenna 16 of the NFC-capable object 12. Once the NFC connection has been established, the NFC-capable object 12 and the NFC-capable device 14 can exchange information and data and/or establish a short-range wireless communication connection or low-energy, short-range wireless communication connection, which may be maintained after the NFC antenna 68 has been removed from the proximity of the NFC antenna 16.

In response to establishing the NFC connection between the NFC antenna 16 of the NFC-capable object 12 and the NFC antenna 68 of the NFC-capable device 14, the CP 22 (through processor 24 running computer-readable instructions 28) may cause the light 18 to turn off. This is shown at reference numeral 214. The CP 22 transmits another lighting instruction 84' to the control module 46 of the lighting system 44. The control module 46 is responsive to the other lighting instruction 84' from the CP 22. The control module 46 generates another lighting output 86' that corresponds with the lighting instruction 84' and includes another function that is to be performed by the light 18. The control module 46 transmits the other lighting output 86' to the light 18. In response, the light 18 performs the function, which in this example is to turn off.

As mentioned above, the initial indication 82 may be the recognition of the wireless local area network signal, the short-range wireless communication signal, and/or the low energy, short-range wireless communication signal from the NFC-enabled device 14. When the recognition of one of these signals is the indication 82, the loss of the corresponding signal may initiate the process to turn off the light 18. In this example, after the CP 22 and the control module 46 cause the light 18 to illuminate the location of the NFC antenna 16, the logo of the NFC antenna 16, or the area within proximity of the location of the NFC antenna 16 in the pattern (reference numeral 204), the CP 22 monitors for a loss of the wireless local area network signal, the short-range wireless communication signal, and/or the low energy, short-range wireless communication signal. This is shown at reference numeral 208. The CP 22 uses the communications module 36, the short-range wireless communication module 30, and/or the low energy, short-range wireless communication module 31 to monitor for the loss of signal.

In response to the loss of signal, the CP 22 (through processor 24 running computer-readable instructions 28) may cause the light 18 to turn off as previously described in reference to reference numeral 214.

In still another example, after the CP 22 causes the light 18 to illuminate the location of the NFC antenna 16, the logo of the NFC antenna 16, or the area within proximity of the location of the NFC antenna 16 in the pattern (reference numeral 204), the CP 22 monitors the time since causing the light 18 to illuminate. This is shown at reference numeral 210. The CP 22 may monitor the time in response to causing the light 18 to illuminate and using the real-time clock 48. After a set time has passed since causing the light 18 to illuminate, the CP 22 (through processor 24 running computer-readable instructions 28) may cause the light 18 to turn off as previously described in reference to reference numeral 214.

In still another example, after the CP 22 causes the light 18 to illuminate the location of the NFC antenna 16, the logo of the NFC antenna 16, or the area within proximity of the location of the NFC antenna 16 in the pattern (reference numeral 204), the CP 22 may receive a turn-off input 88. This is shown at reference numeral 212. In the example shown at reference numeral 212, the turn-off input 88 is received at the user interface 50 and transmitted to the CP 22. When the turn-off input 88 is received through a user interface 50, the turn-off input 88 may be a verbal input received through the microphone 52 of the user interface or a non-verbal input received through the touchscreen 54 or the keypad 56 of the user interface 50. When the NFC-capable object 12 is the vehicle 12', the turn-off input 88 may be an advisor input that is received by the vehicle 12' (this example will be described in more detail in reference to FIG. 3).

In response to receiving the turn-off input 88, the CP 22 (through processor 24 running computer-readable instructions 28) may cause the light 18 to turn off as previously described in reference to reference numeral 214.

Referring now to FIG. 3, an example of the system 10' for locating an in-vehicle NFC antenna 16' is depicted. In the example shown in FIG. 3, the NFC-capable object 12 is the vehicle 12'. The system 10' may also include the NFC-capable device 14, a carrier/communication system 90, and a center 92 that provides back-end services to the vehicle 12'. The NFC-capable device 14 may be the NFC-capable device 14 shown and described in reference to FIG. 1.

In the examples disclosed herein, the vehicle 12' may be a car, motorcycle, truck, or recreational vehicle (RV) that is equipped with suitable hardware and computer readable instructions/code that enable it to cause the in-vehicle light 18' to illuminate the location of the in-vehicle NFC antenna 16', the logo of the in-vehicle NFC antenna 16', or the area around the location of the in-vehicle NFC antenna 16' in the pattern in response to receiving the indication 82 of an imminent use of the in-vehicle NFC antenna 16'. The vehicle 12' may have all of the components described above in reference to the NFC-capable object 12 and may function in any way the NFC-capable object 12 may function.

The vehicle 12' is equipped with the in-vehicle NFC antenna 16' and suitable hardware and computer readable instructions/code that enable it to cause the in-vehicle light 18' to illuminate the location of the in-vehicle NFC antenna 16', the logo of the in-vehicle NFC antenna 16', or the area within proximity of the location of the in-vehicle NFC antenna 16' in a pattern, in response to receiving the indication 82 of the imminent use of the in-vehicle NFC antenna 16'.

The in-vehicle NFC antenna 16' may be located anywhere in the vehicle 12'. For example, the in-vehicle NFC antenna 16' may be positioned at or beneath the surface of the console (e.g., center console), the dashboard, the infotainment control panel, the brow of the instrument panel, between the infotainment control panel and the console, etc. In another example, the in-vehicle NFC antenna 16' may be located within a physical control, such as a rotary controller (e.g., a volume knob). In still another example, the in-vehicle NFC antenna 16' may be positioned at or beneath the surface of a rear seat console, a rear seat infotainment control panel, etc.

In the example shown in FIG. 3, the CP 22 is a vehicle communications platform (VCP) 22'. In an example, the VCP 22' is an on-board vehicle dedicated communications and entertainment device. In another example (not shown), the VCP 22' is an on-board vehicle dedicated communications device (e.g., a telematics unit), and the vehicle 12' includes a separate on-board vehicle dedicated entertainment device (e.g., an infotainment unit). Whether integrated into a single unit (e.g., VCP 22') or included as separate units, the on-board vehicle dedicated communications and entertainment device(s) include hardware components that are capable of running computer readable instructions/code, which are embodied on non-transitory, tangible computer readable media.

As mentioned above, the CP 22 may provide a variety of services. When the CP 22 is the VCP 22' other examples of the services may include, but are not limited to: turn-by-turn directions and other navigation-related services provided in conjunction with a location detection unit; airbag deployment notification and other emergency or roadside assistance-related services; and infotainment-related services where music, Web pages, movies, television programs, videogames and/or other content is downloaded by the VCP 22' via a vehicle bus system 42' and an audio bus system (not shown). The listed services are by no means an exhaustive list of all the capabilities of the VCP 22', but are simply an illustration of some of the services that the VCP 22' is capable of offering.

The VCP 22' includes an electronic processing device 24' operatively coupled to one or more types of electronic memory 26'. The electronic processing device 24' of the vehicle 12' may be similar to the processor 24 of the NFC-capable object 12, and is capable of executing the computer readable instructions 28' stored in the memory 26', which may be similar to the electronic memory 26.

The VCP 22' is also equipped with a NFC module 29' and in-vehicle NFC antenna 16'. In some instances, the VCP 22' may be additionally equipped with a short-range wireless communication module 30' and/or a low energy, short-range wireless communication module 31'. The modules 30' and 31' include a respective transceiver 32', 33' for transmitting and sending signals/data and a respective node 34', 35' to provide the autonomous communication link 20. In other instances, the VCP 22' may also include a communications module 36', which includes a cellular chipset/component 38' for voice communications and a data transmission unit 40' for data transmission. The VCP 22' may also include a real-time clock 48'.

The VCP 22' is operatively connected to the vehicle bus system 42'. As illustrated in FIG. 3, the vehicle 12' may also include other systems that are directly or indirectly connected to the vehicle bus system 42'. Examples of one of these other systems include an in-vehicle lighting system 44' and a user interface 50'.

The in-vehicle lighting system 44' is similar to the lighting system 44 and includes the control module 46' and the in-vehicle light 18'. The in-vehicle light 18' may be any light source (e.g., bulb, light emitting diode (LED), etc.) that is dedicated to illuminating the location of the in-vehicle NFC antenna 16', the logo of the in-vehicle NFC antenna 16', or the area within proximity of the location of the in-vehicle NFC antenna 16' in the pattern. As examples, the in-vehicle light 18' may be the previously described backlight, spotlight, single light, light strip (e.g., positioned on any of the console, dashboard, etc.), series of lights, etc.

In the examples disclosed herein, it is to be understood that the in-vehicle light 18' is not alone a display graphic or a light of an in-vehicle system (e.g., a backlight of a system control input, a backlight of the instrument panel, an alarm light, or another like system light).

In some examples, the in-vehicle light 18' is a white light. In other examples, the in-vehicle light 18' is a colored light, such as a red light, an orange light, a yellow light, a green light, a blue light, a purple light, a pink light, or a brown light. The in-vehicle light 18' may change colors or may illuminate multiple colors at the same time. The in-vehicle light 18' may include differently colored bulbs or a red green blue (RGB) LED that is capable of changing to a desirable color. The in-vehicle light 18' may also be a flashing light (i.e., a light that turns on and off at least once every second) or a pulsing light (i.e., a light that modulates its brightness).

The user interface 50' is operatively connected to the vehicle bus system 42'. The user interface 50' may be similar to the user interface 50. As shown in FIG. 3, the user interface 50' may include a microphone 52', a touchscreen 54', and/or a keypad 56'. Similar to the user interface 50, the user interface 50' may allow a user to indicate to the VCP 22' that he/she is about to use the in-vehicle NFC antenna 16', may allow a user to create a user-defined indication of an imminent use of the in-vehicle NFC antenna 16'.

As mentioned above, the system 10' may also include the carrier/communication system 90, and the center 92 that provides back-end services to the vehicle 12'. In some of the examples disclosed herein, data (e.g., indication 82, turn-off input 88, etc.) may be transmitted to, from, and/or between communication component(s) of the vehicle 12', the NFC-capable device 14, and/or the center 92 using the carrier/communication system 90. Some of these communication links between the various components are shown as lightning bolts and arrows in FIG. 3.

In an example, the carrier/communication system 90 is a two-way radio frequency (RF) communication system. The carrier/communication system 90 may include one or more cell towers 94 or satellites (not shown). It is to be understood that the carrier/communication system 90 may also include one or more base stations and/or mobile switching centers (MSCs) 96 (e.g., for a 2G/3G network), one or more evolved Node Bs (eNodeB) and evolved packet cores (EPC) 98 (for a 4G (long-term evolution, LTE) network), and/or one or more land networks 100. The carrier/communication system 90 may be part of a cellular radio environment or a satellite radio environment, which may include a variety of wireless network providers (which include mobile network operator(s), not shown), utilizing the same or a variety of radio access technologies. While several examples have been provided, it is to be understood that the architecture of the wireless carrier/communication system 90 may be GSM (global system for mobile telecommunications), CDMA2000, UMTS (universal mobile telecommunications system), LTE, or some other available architecture.

An Internet connection may also be utilized for the transmission of message(s), advisor inputs, etc. In this example, the transmission of the message(s), advisor inputs, etc. may be made using the carrier/communication system 90, either through the vehicle's Internet connection (e.g., when the vehicle 12' is equipped with a 4G long-term evolution, LTE, or other suitable Internet connection) or through the NFC-capable device's cellular and Internet connection.

The vehicle 12' may use the VCP 22' for vehicle communications over the carrier/communication system 90. The vehicle communications utilize radio or satellite transmissions to establish a voice channel with the carrier/communication system 90 such that both voice and data transmissions may be sent and received over the voice channel. In some instances, vehicle communications are enabled through the VCP 22' via the communications module 36'.

The center 92 is designed to provide the vehicle 12' with a number of different system back-end functions. According to the example shown in FIG. 3, the center 92 includes an advisor 102, 104. The advisor 102, 104 may be a live advisor 102 or an automated call response system 104. In addition to the advisor 102, 104, the center 92 generally includes the processor 106, a communication transceiver 110, and one or more switches 112. As illustrated in FIG. 3, the various center components may be coupled to one another via a network connection or bus 114, such as one similar to the bus 42 previously described.

The processor 106 may be a controller, a host processor, an ASIC, or a processor working in conjunction with a central processing unit (CPU). The processor 106 is capable of executing the computer readable instructions that are stored on the electronic memory 108.

The communication transceiver 110 may be in selective communication with the VCP 22'. The communication transceiver 110 may be any suitable data transmission system that is capable of sending and/or receiving data communications over the carrier/communication system 90. For example, the communication transceiver 110 is capable of sending the indication 82 of the imminent use of the in-vehicle NFC antenna 16' to the vehicle 12'.

The switch(es) 112 may be private branch exchange (PBX) switch(es). The switch 112 routes incoming signals so that voice transmissions are usually sent to either the live advisor 102 or the automated response system 104, and data transmissions are passed on to a modem or other piece of equipment (e.g., a communications module) for demodulation and further signal processing.

It is to be understood that the center 92 shown in FIG. 3 may be virtualized and configured in a Cloud Computer, that is, in an Internet-based computing environment. For example, the automated response system 104 (and other computing equipment) may be accessed as a Cloud platform service, or PaaS (Platform as a Service), utilizing Cloud infrastructure rather than hosting the live advisor 102 at the center 92. In these instances, the automated response system 104 (and other center 92 components) may be virtualized as a Cloud resource. The Cloud infrastructure, known as IaaS (Infrastructure as a Service), typically utilizes a platform virtualization environment as a service, which may include components such as processor 106, the automated response system 104, and other computer equipment. In an example, the real-time services performed by the live advisor 102 or the automated call response system 104 disclosed herein may be performed in the Cloud via the SaaS (Software as a Service).

As mentioned above, when the NFC-capable object 12 is the vehicle 12', the indication 82 of the imminent use of the NFC antenna 16' may also be an advisor input received at the vehicle 12'. A user request for help locating the in-vehicle NFC antenna 16' may be received at the center 92 and directed by the switch 112 to the live advisor 102 or the automated call response system 104. The user request may be an explicit request for help locating the in-vehicle NFC antenna 16', or it may be a request that requires the use of the in-vehicle NFC antenna 16'. The user request may be input via the user interface 50'. The user request is received by the live advisor 102 or the automated call response system 104 and is determined to be a request for help locating the in-vehicle NFC antenna 16'. The live advisor 102 or the automated call response system 104 may send (via the communication transceiver 110) an advisor input to the VCP 22', which the VCP 22' may recognize as the indication 82 of the imminent use of the in-vehicle NFC antenna 16'. The VCP 22' (through processor 24' running computer-readable instructions 28') may then send instructions to the control module 46' of the lighting system 44', which causes the in-vehicle light 18' to illuminate the location of the in-vehicle location of the NFC antenna 16', the logo of the in-vehicle NFC antenna 16', or the area within proximity of the location of the in-vehicle NFC antenna 16' in the pattern.

While the advisor input received at the vehicle 12' is one example of the indication 82 of the imminent use of the NFC antenna 16', any of the previously described indications 82 may also be utilized when the object 12 is the vehicle 12'.

Additionally, as mentioned above, when the NFC-capable object 12 is the vehicle 12', the turn-off input 88 may also be an advisor input that is received by the vehicle 12'. The live advisor 102 or the automated call response system 104 may determine that the in-vehicle light 18' no longer needs to illuminate the location of the in-vehicle NFC antenna 16', the logo of the in-vehicle NFC antenna 16', or the area within proximity of the location of the in-vehicle NFC antenna 16'. The live advisor 102 or the automated call response system 104 may make this determination as a result of recognizing that a NFC connection has been established or as a result of receiving other information from the user or the vehicle 12'. Once the live advisor 102 or the automated call response system 104 has made the determination that the in-vehicle light 18' should be turned off, it may send (via the communication transceiver 110) an advisor input to the VCP 22'. The VCP 22' may recognize the advisor input as the turn-off input 88. The VCP 22' (through processor 24' running computer-readable instructions 28') and the control module 26' may then cause the in-vehicle light 18' to turn off.

While the advisor input received at the vehicle 12' is one example of the turn-off input 88, any of the previously described turn-off inputs 88 may also be utilized when the object 12 is the vehicle 12'.

It is to be understood that the term "communication" as used herein is to be construed to include all forms of communication, including direct and indirect communication. Indirect communication may include communication between two components with additional component(s) located therebetween.

Further, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

It is to be understood that the ranges provided herein include the stated range and any value or sub-range within the stated range. For example, a range within about 4 centimeters should be interpreted to include not only the explicitly recited limits of within about 4 centimeters, but also to include individual values, such as within about 1.5 centimeters, within about 2 centimeters, within about 3.75 centimeters, etc., and sub-ranges, such as from about 1.25 centimeters to about 3.75 centimeters, from about 1.5 centimeters to about 4 centimeters, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for locating a Near Field Communication (NFC) antenna, the method comprising:
   receiving an indication of an imminent use of the NFC antenna to establish a NFC connection with a NFC device;
   in response to receiving the indication, illuminating, according to a pattern, an in-vehicle light that illuminates a location of the NFC antenna, a logo of the NFC antenna, or an area within proximity of the location of the NFC antenna;
   in response to illuminating the in-vehicle light to illuminate the location of the NFC antenna, the logo of the NFC antenna, or the area within proximity of the location of the NFC antenna, monitoring a time since illuminating the in-vehicle light to illuminate the location of the NFC antenna, the logo of the NFC antenna, or the area within proximity of the location of the NFC antenna; and
   turning the in-vehicle light off after a set time has passed since illuminating the in-vehicle light to illuminate the location of the NFC antenna, the logo of the NFC antenna, or the area within proximity of the location of the NFC antenna.

2. The method as defined in claim 1 wherein the in-vehicle light is located within the vehicle and is one of:
   a backlight that illuminates the location of the NFC antenna, the logo of the NFC antenna, or the area within proximity of the location of the NFC antenna from behind; or a spotlight that illuminates the location of the NFC antenna, the logo of the NFC antenna, or the area within proximity of the location of the NFC antenna by projecting a narrow light
   beam onto the location of the NFC antenna, the logo of the NFC antenna, or the area within proximity of the location of the NFC antenna; or
   a light positioned within proximity of the location of the NFC antenna.

3. The method as defined in claim 1 wherein the pattern resembles a geometric shape.

4. The method as defined in claim 1, further comprising:
   establishing the NFC connection through the NFC antenna; and
   turning the in-vehicle light off in response to establishing the NFC connection.

5. The method as defined in claim 1 wherein the indication of the imminent use of the NFC antenna to establish the NFC connection with the NFC device is an input received through a user interface, a time of day, or a detection of the NFC device.

6. The method as defined in claim 5 wherein the indication of the imminent use of the NFC antenna to establish a NFC connection with a NFC device is the input received through the user interface, and wherein the input is a verbal input received through a microphone of the user interface or a non-verbal input received through a touchscreen or a keypad of the user interface.

7. The method as defined in claim 5 wherein the indication of the imminent use of the NFC antenna to establish a NFC connection with a NFC device is the detection of the NFC device, and wherein the detection of the NFC device is a detection of a low energy, short-range wireless communication signal, a detection of a short-range wireless communication signal, or a detection of a wireless local area network signal.

8. The method as defined in claim 7, further comprising:
   in response to the detection of the NFC device, monitoring the low energy, short-range wireless communication signal, the short-range wireless communication signal, or the wireless local area network signal for a loss of signal; and
   in response to the loss of signal corresponding to at least one of the low energy, short-range wireless communication signal, the short-range wireless communication signal, or the wireless local area network signal, turning the in-vehicle light off.

9. The method as defined in claim 1 wherein the in-vehicle light is at least one of a white light, a colored light, a pulsing light, or a flashing light.

10. A system for locating an in-vehicle Near Field Communication (NFC) antenna, comprising:
    a vehicle communications platform operatively disposed in a vehicle, the vehicle communications platform to recognize an indication of an imminent use of the in-vehicle NFC antenna to establish a NFC connection with a NFC device;

an in-vehicle lighting system having a control module in communication with the vehicle communications platform, wherein the vehicle communications platform transmits a lighting instruction to the in-vehicle lighting system upon recognizing the indication of the imminent use of the in-vehicle NFC antenna to establish a NFC connection with a NFC device; and an in-vehicle light configured to, when illuminated, illuminate a location of the in-vehicle NFC antenna, a logo of the NFC antenna, or an area within proximity of the location of the in-vehicle NFC antenna, wherein the control module of the in-vehicle lighting system is configured to, in response to the lighting instruction, illuminate the in-vehicle light according to a pattern and illuminate the location of the in-vehicle NFC antenna, the logo of the NFC antenna, or the area within proximity of the location of the in-vehicle NFC antenna, wherein the control module of the in-vehicle lighting system is configured to, in response to illuminating the in-vehicle light to illuminate the location of the NFC antenna, the logo of the NFC antenna, or the area within proximity of the location of the NFC antenna, monitor a time since illuminating the in-vehicle light to illuminate the location of the NFC antenna, the logo of the NFC antenna, or the area within proximity of the location of the NFC antenna, and turn off the in-vehicle light after a set time has passed since illuminating the in-vehicle light.

11. The system as defined in claim 10, wherein the in-vehicle NFC antenna is operatively disposed within the vehicle.

12. The system as defined in claim 10 wherein the in-vehicle light is one of:
  a backlight that illuminates the location of the in-vehicle NFC antenna, the logo of the NFC antenna, or the area within proximity of the location of the in-vehicle NFC antenna from behind;
  a spotlight that illuminates the location of the in-vehicle NFC antenna, the logo of the NFC antenna, or the area within proximity of the location of the in-vehicle NFC antenna by projecting a narrow light beam onto the location of the in-vehicle NFC antenna, the logo of the in-vehicle NFC antenna, or the area within proximity of the location of the in-vehicle NFC antenna in the pattern; or
  a light positioned within proximity of the in-vehicle NFC antenna.

13. The system as defined in claim 10 wherein the in-vehicle light is at least one of a white light, a colored light, a pulsing light, or a flashing light.

14. The system as defined in claim 10, further comprising a user interface, the user interface configured to:
  receive an input indicating the imminent use of the in-vehicle NFC antenna; and
  transmit the input to the vehicle communications platform,
  wherein the vehicle communications platform is configured to transmit the lighting instruction to the in-vehicle lighting system in response to receipt of the input indicating the imminent use of the in-vehicle NFC antenna.

15. The system as defined in claim 10, further comprising a low energy, short-range wireless communication module, a short-range wireless communication module, or a cellular adapter to:
  detect a low energy, short-range wireless communication signal, a short-range wireless communication signal, or a wireless local area network signal; and
  transmit a notification of the detection to the vehicle communications platform,
  wherein the vehicle communications platform is configured to transmit the lighting instruction to the in-vehicle lighting system in response to the notification.

16. A method for locating a Near Field Communication (NFC) antenna, the method comprising:
  receiving an indication of an imminent use of the NFC antenna to establish a NFC connection with a NFC device;
  in response to receiving the indication, illuminating a light according to a pattern to illuminate a location of the NFC antenna, a logo of the NFC antenna, or an area within proximity of the location of the NFC antenna;
  in response to illuminating the light to illuminate the location of the NFC antenna, the logo of the NFC antenna, or the area within proximity of the location of the NFC antenna, monitoring a time since illuminating the light to illuminate the location of the NFC antenna, the logo of the NFC antenna, or the area within proximity of the location of the NFC antenna; and
  turning off the light after a set time has passed since illuminating the light to illuminate the location of the NFC antenna, the logo of the NFC antenna, or the area within proximity of the location of the NFC antenna.

* * * * *